Dec. 25, 1951      C. R. LEIGHTON      2,579,680
PLANER BLADE GRINDING ATTACHMENT
Filed Aug. 3, 1949
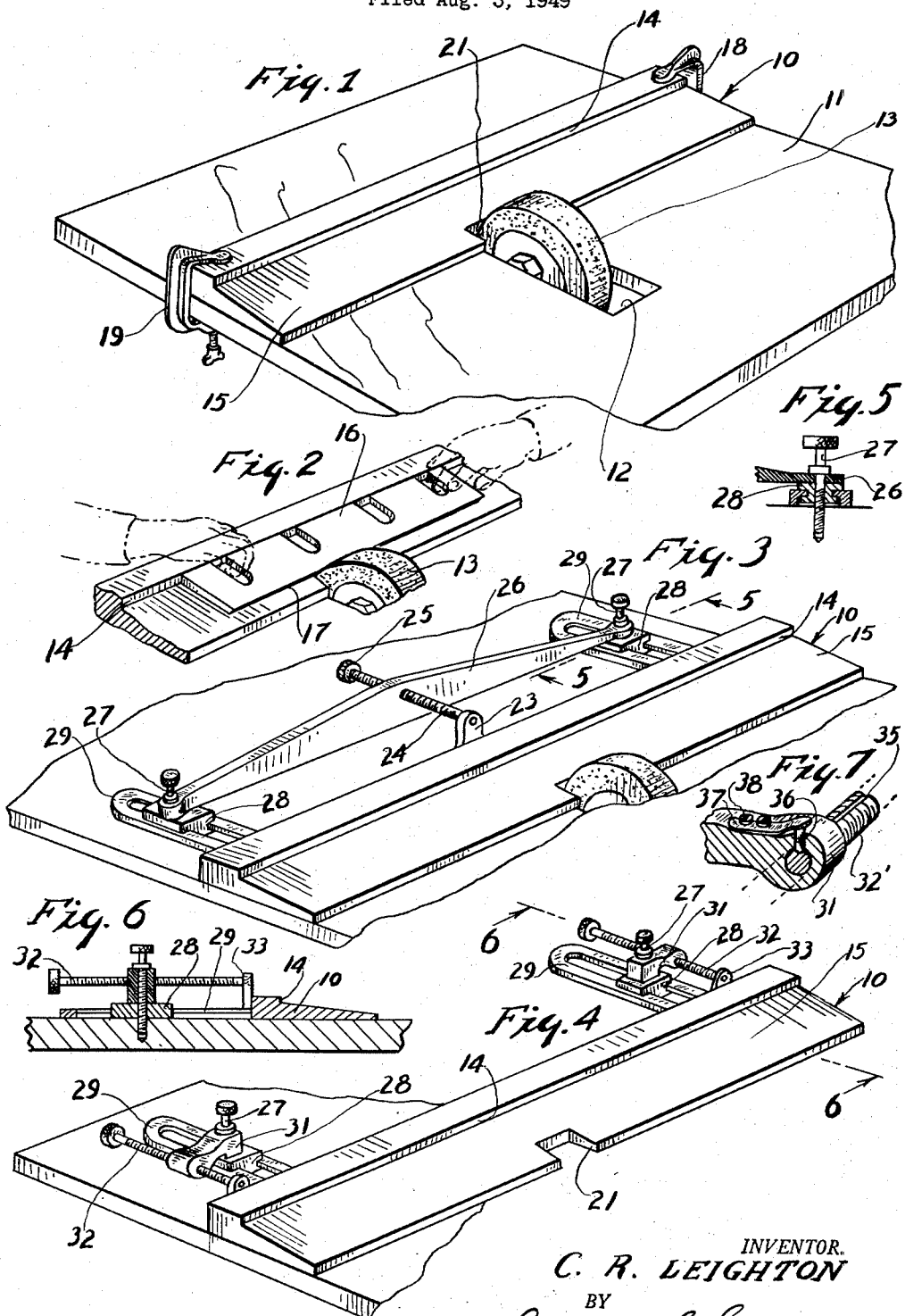
INVENTOR.
C. R. LEIGHTON
BY
Laforest S. Saulsbury
ATTORNEY Patented Dec. 25, 1951

2,579,680

UNITED STATES PATENT OFFICE 2,579,680

PLANER BLADE GRINDING ATTACHMENT

Charles R. Leighton, Limestone, Maine

Application August 3, 1949, Serial No. 108,289

2 Claims. (Cl. 51—102)

This invention relates to a planer blade grinding attachment.

It is an object of the present invention to provide a planer blade grinding attachment which can be placed upon the surface of a saw table and which has a surface and a shoulder against which the planer blade can be slid while having engagement with the emery wheel located on the driving shaft of the saw table, the attachment being notched to receive the grinding wheel and wherein there is provided means for effecting the easy adjustment of the supporting plate for the planer blade relative to the grinding wheel.

Other objects of the present invention are to provide a planer blade grinding attachment which is of simple construction, inexpensive to manufacture, adapted for use on a saw table, easy to install upon the table, has a minimum number of parts, compact and durable, convenient to use and efficient in operation.

For other objects and for a better understanding of the invention, reference may be had to the following detailed description taken in connection with the accompanying drawing, in which Fig. 1 is a perspective view of a supporting plate for the planer blade which is connected to the saw table by means of C-clamps.

Fig. 2 is a fragmentary perspective view of the supporting plate and with the planer blade thereon and illustrating the manner in which it is adjusted thereacross for grinding action upon the grinding wheel.

Fig. 3 is a perspective view of a modified form of the invention wherein there is provided guides at the opposite sides of the supporting plate and centrally thereof there is provided an adjusting screw for adjusting the plate to adapt the plate for the different size of planer blade.

Fig. 4 is a perspective view of a still further form of the invention utilizing different adjusting screw arrangements from that shown in Fig. 3.

Fig. 5 is a fragmentary sectional view taken generally on line 5—5 of Fig. 3.

Fig. 6 is a fragmentary sectional view taken generally on line 6—6 of Fig. 4.

Fig. 7 is a fragmentary perspective and sectional view of a modified form of the device showing the use of a pin adapted to snap to give an indication of the number of turns of adjustment which have been effected with the adjusting screw and as applied to the form of the invention shown in Fig. 4.

Referring now to Figs. 1 and 2, 10 represents a supporting plate adapted to rest on the top surface of a saw table 11 having the usual opening 12 therein. Mounted upon the driving shaft of the saw table is a grinding wheel 13. This grinding wheel merely replaces the usual disc saw and will be rotated with the same speed of rotation as the saw or a different speed depending upon the driving connections, not shown.

Rested upon the table top is the supporting plate 10. This plate is located in front of the grinding wheel and has a shoulder 14 and is wedge shaped toward the forward edge. The surface 15 supports a planer blade 16 in a manner to align its cutting edge 17 at the proper angle upon the grinding wheel 13, as shown more clearly in Fig. 2. The planer blade 16 is accordingly worked back and forth with the hands to effect the different sharpening operations thereupon and upon its cutting edge.

The supporting plate 10 is made secure to the table top by C-clamps 18 and 19 disposed over the opposite ends of the same. The plate 10 is notched, as indicated at 21, to receive the grinding wheel 13.

In Figs. 3 and 5, there is shown a modified form of the invention wherein the supporting plate 10 has an upstanding projection 23 intermediate its length from which extends an adjusting screw 24 having a turning knob 25 thereon. This adjusting screw extends through a longitudinally extending member 26 which is fashioned at its opposite ends to receive fastening bolts 27, Fig. 5, which are threaded and adapted to extend down into the saw table top. These bolts extend downwardly respectively through guide members 28 and these guide members receive rearwardly U-shaped projections 29 on the supporting plate 10. When the screw 24 is adjusted, the plate 10 will be adjusted either closer to or farther away from the grinding wheel and since the guide projections 29 are disposed upon the opposite ends of the plates, the adjustment will be effected evenly and easily. Once the adjustment has been effected, the screws 27 can be tightened into the table top to positively lock the plate projections to the table top and to make certain that the plate 10 is made fixed to the table top. The planer blade 16 is then used upon the plate 10 in the same manner as illustrated in Fig. 2 to effect the sharpening edge of the same.

In Figs. 4 and 6, there is shown a slightly different form of the invention. The supporting plate 10 is provided with the same projections 29 and guides 28. Also there is provided the fastening pins 27. These fastening pins extend through blocks 31 which respectively contain adjusting screws 32. Two adjusting screws are provided upon the attachment, as shown in Fig. 4, to effect the adjustment of the plate 10. As the screws 27 are loosened, the guides 28 are loosened and the projections 29 are free to slide. The screws 32 are respectively mounted on projections 33. The adjustment can be easily effected by turning the screws 32 so as to move the plate 10 along the table top 11.

In Fig. 7, there is shown a slightly modified form of the invention wherein there is provided a screw 32' in which is a longitudinally extending groove 35. The block 31 has an opening therein in which is a pin 36. A spring 37 is secured by screws 38 to the top of the block 31 and this spring bears against the pin 36 to normally retain the pin in the groove 35. Each time a turn is made of the screw 32 a click will be effected to give some indication to the user of the attachment of the number of turns of the screw which have been effected. Every one rotation of the screw causes a click to be felt.

It should be apparent with these attachments that the easy adjustment of the plate 10 can be effected. This is effected by merely turning the adjusting screws 24 or 32. The locking screws 27 can be at all times easily adjusted to release the plate projections 29 or to secure them and the plate in the adjusted position.

While various changes may be made in the detail construction, it shall be understood that such changes shall be within the spirit and scope of the present invention as defined by the appended claims.

What is claimed is:

1. A planer blade grinding attachment comprising a blade supporting plate adapted to be connected to a saw table having a grinding wheel thereon, said plate having a rear shoulder and a forwardly tapered and downwardly inclined supporting face, said shoulder adapted to retain the planer blade against rearward displacement while the same is being laterally adjusted for sharpening engagement with the grinding wheel, and means adapted to secure the plate to a saw table, said means adapted for the securement of the attachment to the saw table top comprising two projections with each having an elongated opening therein and each secured respectively to the opposite ends of the supporting plate, guide block means within the elongated openings and securing pins adapted to enter the saw table top to fix the guide block means thereto and the projections against movement and manually adjustable means connected between the pins and the supporting plate to adjust the plate relative to the saw table, each said manually adjustable means consisting of a lead screw to enable fine accurate adjustment to be made at each end of the plate to assure its proper desired grinding position for a planer blade to be sharpened, and the blade supporting plate being disposed to position a blade above the horizontal axial plane of the grinding wheel to establish a hollow grinding action on the blade.

2. A planer blade grinding attachment comprising a blade supporting plate adapted to be connected to a saw table having a grinding wheel thereon, said plate having a rear shoulder and a forwardly tapered and downwardly inclined supporting face, said shoulder adapted to retain the planer blade against rearward displacement while the same is being laterally adjusted for sharpening engagement with the grinding wheel, and means adapted to secure the plate to a saw table, said means adapted for the securement of the attachment to the saw table top comprising two projections with each having an elongated opening therein and each secured respectively to the opposite ends of the supporting plate, guide block means within the elongated openings and securing pins adapted to enter the saw table top to fix the guide block means thereto and the projections against movement, and said guide means including blocks in the opening of the projections, and each block having an adjusting lead screw threaded therein, a projection on each end of the supporting plate and adapted to respectively receive the adjusting screws, said adjusting screws consisting of threaded lead screws with manually operable heads, to enable fine accurate adjustments to be made manually, and the blade-supporting plate being disposed to position a blade above the horizontal axial plane of the grinding wheel, to establish a hollow grinding action on the blade.

CHARLES R. LEIGHTON.

REFERENCES CITED

The following references are of record in the file of this patent:

UNITED STATES PATENTS

| Number | Name | Date |
|---|---|---|
| 62,071 | Riley | Feb. 12, 1867 |
| 335,984 | White | Feb. 9, 1886 |
| 442,788 | Visscher | Dec. 16, 1890 |
| 582,674 | Nydegger | May 18, 1897 |
| 818,933 | Bellows | Apr. 24, 1906 |
| 1,385,649 | Sherman | July 26, 1921 |
| 1,401,560 | Royle | Dec. 27, 1921 |
| 2,052,837 | Makaroff | Sept. 1, 1936 |